J. T. QUIGLEY.
TIME COST METER.
APPLICATION FILED JUNE 3, 1912.

1,139,718.

Patented May 18, 1915.
5 SHEETS—SHEET 1.

WITNESSES

INVENTOR
JOHN T. QUIGLEY
BY Miller & White
his ATTORNEYS

J. T. QUIGLEY.
TIME COST METER.
APPLICATION FILED JUNE 3, 1912.

1,139,718.

Patented May 18, 1915.
5 SHEETS—SHEET 3.

Fig. 4

WITNESSES

INVENTOR
JOHN T. QUIGLEY
BY Miller & White
his ATTORNEYS

J. T. QUIGLEY.
TIME COST METER.
APPLICATION FILED JUNE 3, 1912.

1,139,718.

Patented May 18, 1915.
5 SHEETS—SHEET 4.

WITNESSES
H. J. Pint.
H. A. Scholten.

INVENTOR
JOHN T. QUIGLEY
BY Miller & White
his ATTORNEYS

J. T. QUIGLEY.
TIME COST METER.
APPLICATION FILED JUNE 3, 1912.

1,139,718.

Patented May 18, 1915.
5 SHEETS—SHEET 5.

WITNESSES

INVENTOR
JOHN T. QUIGLEY
BY
his ATTORNEYS

UNITED STATES PATENT OFFICE.

JOHN T. QUIGLEY, OF SAN FRANCISCO, CALIFORNIA, ASSIGNOR TO THE COSTMETER COMPANY, OF SAN FRANCISCO, CALIFORNIA, A CORPORATION OF CALIFORNIA.

TIME-COST METER.

1,139,718.  Specification of Letters Patent.  Patented May 18, 1915.

Application filed June 3, 1912. Serial No. 701,202.

*To all whom it may concern:*

Be it known that I, JOHN T. QUIGLEY, a citizen of the United States, and a resident of the city and county of San Francisco, California, have invented certain new and useful Improvements in Time-Cost Meters, of which the following is a specification.

The invention relates to devices for calculating and recording the money value of elapsed time.

The present application covers various improvements in the devices as set forth in my prior applications Serial Number 443,506 filed July 14, 1908 and Serial Number 488,162 filed April 6, 1909.

The object of the invention is to provide a mechanism for calculating and automatically recording the cost of elapsed time in terms of linear measure.

Another object of the invention is to provide a mechanism for electrically operating the tape feeding means.

Another object of the invention is to provide means for automatically throwing the tape feeding means out of operation.

A further object of the invention is to simultaneously perforate and identify the record tapes.

A further object of the invention is to provide means for preventing the movement of the tapes from sources external to the machine.

The apparatus possesses other advantageous features, which with the foregoing, will be set forth at length in the following description where I shall outline in full that form of the apparatus which I have selected for illustration in the drawings accompanying and forming part of the present specification.

The novelty of the invention will be included in the claims succeeding said description. From this it will be apparent that I do not limit myself to the showing made by such drawings and description, as I may adopt many variations within the scope of my invention as expressed in said claims.

Referring to the drawings.

The apparatus as a whole comprises mechanism for feeding the tapes at a predetermined speed to correspond to a given money value of time, mechanism for controlling the movement of the tapes, means for producing an identifying impression upon the tapes and simultaneously producing a transverse perforation therein and other mechanisms operating in conjunction with these to produce the desired results.

The records of elapsed time and the cost of elapsed time obtained from the use of the time cost meters of my invention differ from similar records obtained from the use of all prior elapsed time machines. The latter records are embodied in printed or written entries upon the recording bearing material, whereas the records obtained from the use of my invention are embodied in the linear dimension of the record material.

The mechanism forming the subject matter of the present invention is designed to be furnished to each operative and to each machine, a record of whose time or the cost thereof is to be kept. It is evident that it is equally important for a manufacturer to be able to determine the charge to be made per hour for the use of a machine, particularly on a large and expensive machine which is used at intervals, or only for a short time on each job. The working parts of the machine are mounted within a suitable casing 2, several of the walls of which are hinged so that the casing may be opened to give access to the mechanism. In the machine shown in the drawings the top plate or cover 3 is hinged, but in practice I believe this cover is preferably made stationary. The casing 2 is generally divided into two chambers or compartments by the partition 4 which operates as a support and bearing for several of the various devices and sub-mechanisms. The driving mechanism is preferably located in one chamber and the tape feeding mechanism in the other, so that access may be had to either mechanism without disturbing or exposing the other.

Figure 4:
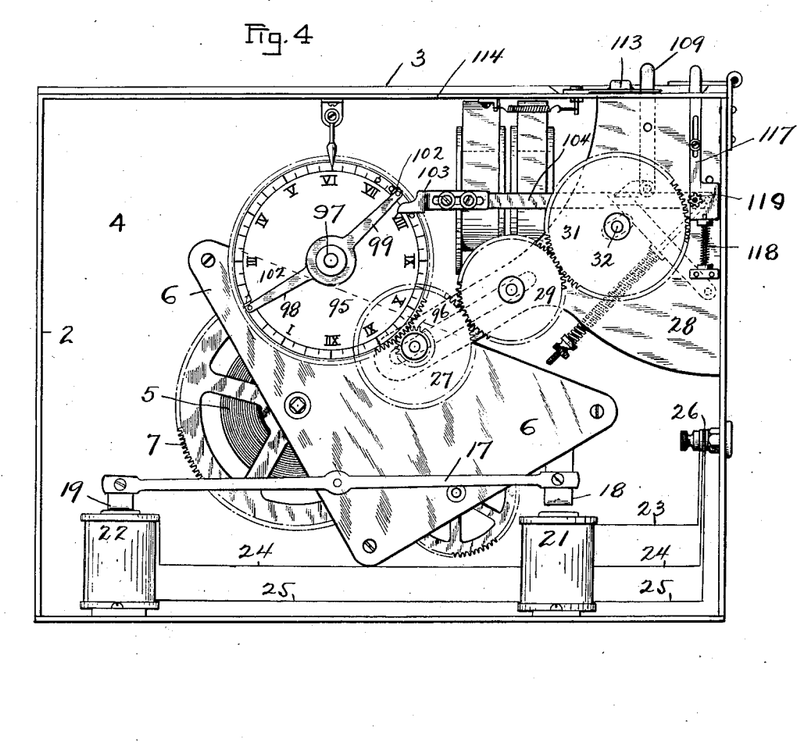
Fig. 4 is an elevation of operating side of the meter, showing the means for controlling the movement of the tapes.
Figure 6:
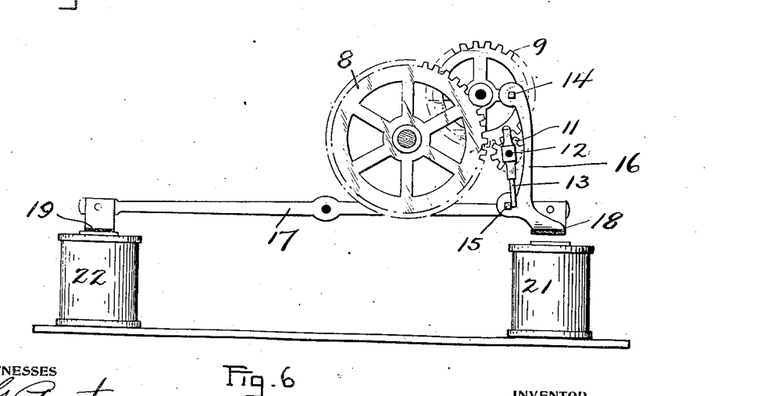
Fig. 6 is a detail elevation of the escapement.

The driving mechanism is illustrated particularly in Figs. 4 and 6. The driving power is supplied by the spring 5 which is preferably part of a heavy clock mechanism arranged in the frame 6 which is secured to the partition 4. The gear 7 on the shaft carrying the spring 5 is connected through the usual gears, such as 8—9 and 11 with the escapement shaft 12. Arranged on this shaft 12 is a pin 13 which is normally held from moving by means of either of the pins 14—15 arranged on the pallet 16. The pins 14—15 are spaced apart a distance slightly less than twice the radius of the circle described by the outer end of the pin 13, so that as one of the pins 14—15 is being moved radially out of contact with the pin 13 the other is being moved into the path of the pin and lies in such path before the pin 13 is disengaged from the other pin. The pins 14—15 are arranged substantially directly on opposite sides of the shaft 12, so that the shaft 12 is advanced half a revolution at each release of the pin 13.

The pallet 16 is mounted adjacent one end of the frame 17 which is centrally pivoted to the frame 6, which is rocked on its pivot by means of intermittent electric currents. Arranged on the ends of the frame 17 are armatures 18—19 directly below which are arranged electro magnetic coils 21—22 which are alternately connected to a source of current supply at regular intervals to produce the necessary movement of the pallet 16. The electro magnets 21—22 are connected by wires 23—24 and 25 to suitable connections 26 arranged on the casing to which the feed wires are attached. The intermittent current, which is generally controlled by a master clock is timed so that the coils are energized alternately at equal time periods. In practice I have found that a movement of the pallet 16 and consequently a half revolution of the escapement shaft 12 every minute to be generally sufficient.

The motion of the drive gear 7 due to the movement of the escapement shaft to which it is connected is communicated through suitable gearing to the gear 27 the shaft of which is supported in the bracket 28. Meshing with gear 27 and adjustably supported on the bracket 28 is an idler gear 29 by means of which the motion of gear 27 is transferred to gear 31, the shaft 32 of which extends through the partition 4 and operates the tape feeding mechanism. The end of shaft 32 upon which gear 31 is mounted transversely so that gear 31 may be moved into or out of mesh with gear 29, to start or stop the feeding of the tapes. The rate at which the tapes are moved depends upon the rate of movement of the gear 31. Since the rate of movement of the shaft on which gear 27 is mounted, is fixed, the speed of gear 31 may be varied by varying the ratio of gears 27 and 29. This is generally accomplished by removing one or both of said gears and substituting gears of different diameters therefor.

Figure 7:
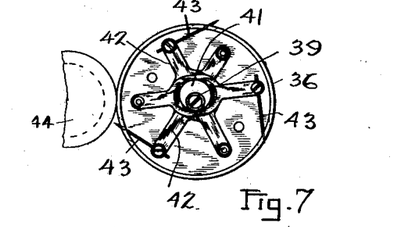
Fig. 7 is a detail elevation of the tape carrier.
Figure 8:
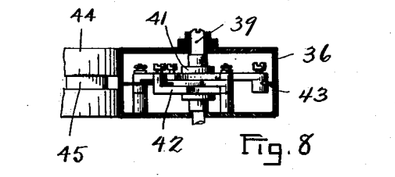
Fig. 8 is a cross section through the tape carrier.

Upon the opposite end of shaft 32 is arranged a gear 33 which transmits the motion of the shaft to gear 34 secured to the tape carrier. The shaft 32 is provided, intermediate its ends, with a universal joint 35 which allows one portion of the shaft to be moved transversely relative to the other. The tape carrier 36 consists of a hollow cylinder having a plurality of pins arranged therein which engage and advance the tape or tapes 37—38 as the carrier is revolved. The tape carrier is mounted and revolves upon a fixed shaft 39 upon which, in the interior of the cylinder, is arranged a fixed cam or eccentric 41. Engaging this cam are a plurality of slotted arms 42 pivotally attached at one end to the cylinder and bearing upon their other ends, the pins 43 which engage the tapes. The pins register with apertures in the cylindrical face of the carrier and as the carrier is rotated the pins advance above and retreat below the surface. Arranged upon the shaft 32 and in line with the tape carrier is a roller 44 having a circumferential groove 45 formed therein which registers with the pins 43 in the tape carrier. The tapes pass between the roller and the carrier and the pins perforate the tapes and positively advance them. The cam 41 on the tape carrier shaft is positioned so that the pins move outward from the carrier as they approach the roller and retreat and are withdrawn from the tapes after the required arc of contact. The carrier is constructed so that at least one pin is always engaging the tapes. By the use of the movable pins much less power is consumed in perforating the tapes, then if the pins were fixed, the tapes are drawn against the surface of the carrier and are positively advanced the correct distance and are removed from contact with the carrier without the aid of stripping devices.

Figure 1:
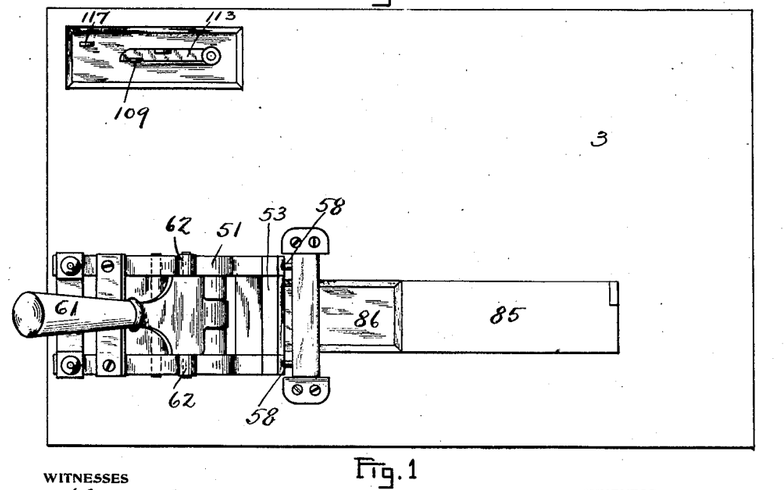
Figure 1 is a plan or top view of cover of the cost-meter showing the stamping mechanism and the slide covering the aperture in the cover.
Figure 2:
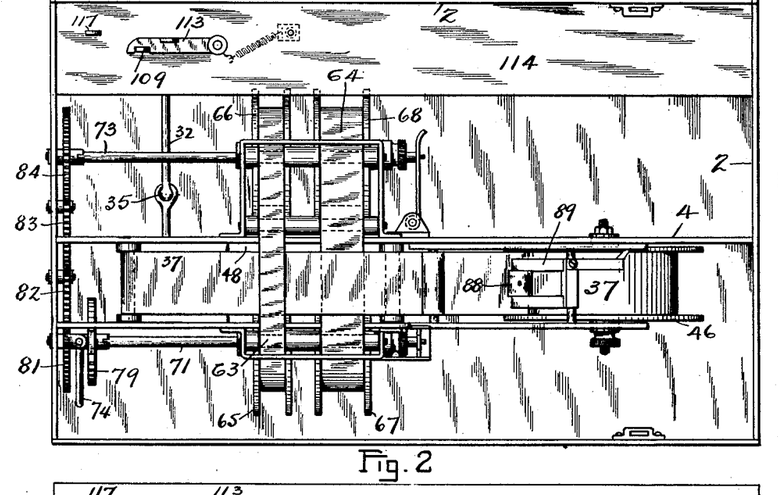
Fig. 2 is a plan or top view of the cost meter with the cover removed.
Figures 3, 10:
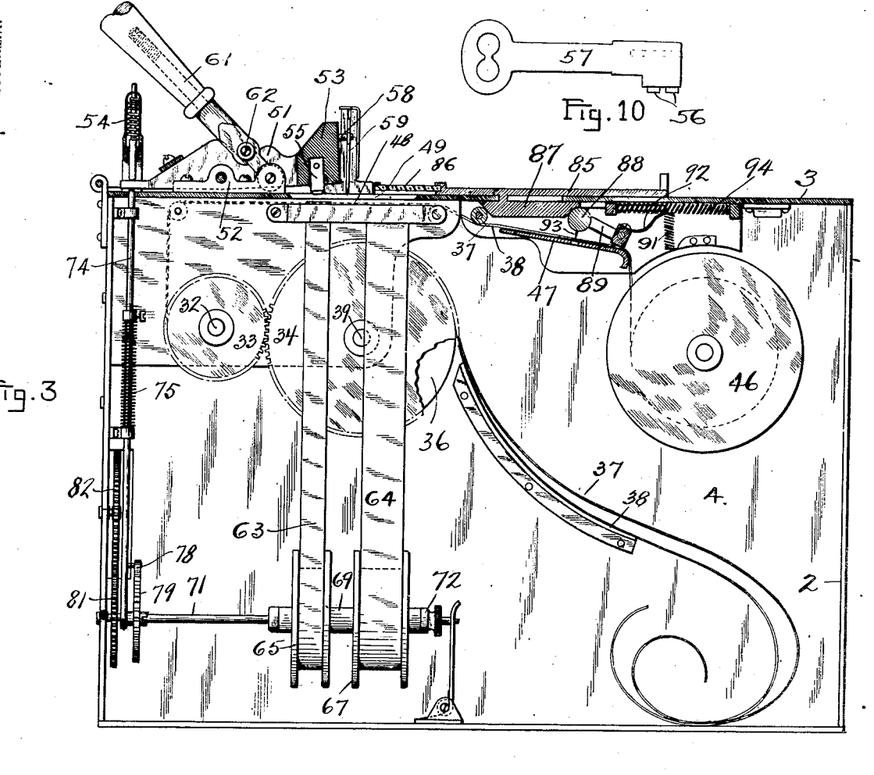
Fig. 3 is an elevation, partly in section of the tape side of the meter, showing the means for manipulating the tapes.
Fig. 10 is a view of the identification key adapted to be used in connection with the device.

The tapes 37—38 are arranged within the casing upon a supply reel 46 which is readily removable so that it may be reloaded. From the supply reel the tapes pass over the plate 47, over the platen 48 which is arranged directly below an aperture 49 in the cover of the case, around the roller 44 and the tape carrier and are accumulated in the case. Arranged above the aperture 49 in the cover is a device for stamping identification marks upon the tapes and for forming a transverse perforation therein. This device consists of a member 51 pivotally attached intermediate its ends to a bracket 52 which is attached to the cover of the case and positioned so that the forward end thereof, which comprises the head 53 occurs directly above one end of the aperture 49 in the cover. The head 53 is normally held elevated by means of the coiled springs 54 which bear downward on the opposite end of the member. The head 53 is provided with a slot opening on the lower face in which are arranged printing dies 55 bearing suitable data to be impressed on the tapes. The data on these dies generally consists of the number of the machine and a character designating the department in which the machine is used. The tapes are also marked with certain characters which identify the operative. These identifying characters 56 are arranged on a key 57 which is adapted to be inserted in the slot in the head, so that the operative identifying marks are impressed on the tapes adjacent the other identification marks.

Operatively connected to the head 53 by the pins 58 is a substantially vertical blade 59 having teeth on its lower edge adapted to produce transverse perforations in the tapes, so that they may be readily separated into sections at such perforations. The platen 48 is provided with a transverse slot in line with the perforating blade, to allow the teeth of the blade to pass through the tapes.

The member 51 is operated to produce the imprint on and perforation of the tapes by means of the handle 61 pivotally attached to the bracket 52. The handle is provided with rollers 62 engaging the upper surface of the member 51 which is formed with an elevated portion and depressed portions lying on opposite sides of the elevated portion. The elevated portion lies substantially directly above the point of connection between the handle and the bracket 52 and normally is farther removed from the pivotal connection than the depressed surfaces. As the handle is moved, therefore, so that the rollers 62 move over the elevated portion, the head of the member is depressed and the tapes are identified and perforated. When the rollers lie in either of the depressed portions, the head of the member is elevated so that a throw of the handle in either direction causes the head to be depressed and raised, so that a return movement of the handle is not necessary to perform the complete operation. By the use of a device of this description, the pressure of the printing dies upon the tapes is the same for every printing operation and the impressions produced are always legible.

Arranged in the case, directly below the printing dies are printing ribbons 63 which overlie each tape, so that the characters on the dies are impressed upon the tapes. The aperture 49 in the cover extends beyond the perforation blade, exposing a section of the upper tape upon which the operative should write the number of the job on which he is beginning to work. A printing ribbon 64 is arranged above the lower tape in line with the clear part of the aperture to transfer the written impression onto the second tape. The job number is therefore written on one end of the section of tape lying between the perforations and the other identification data is printed upon the other end of the section. As the operative finishes one job, he throws the handle 61 and writes on the exposed portion of the tape the number of the job which he next undertakes.

Figure 5:
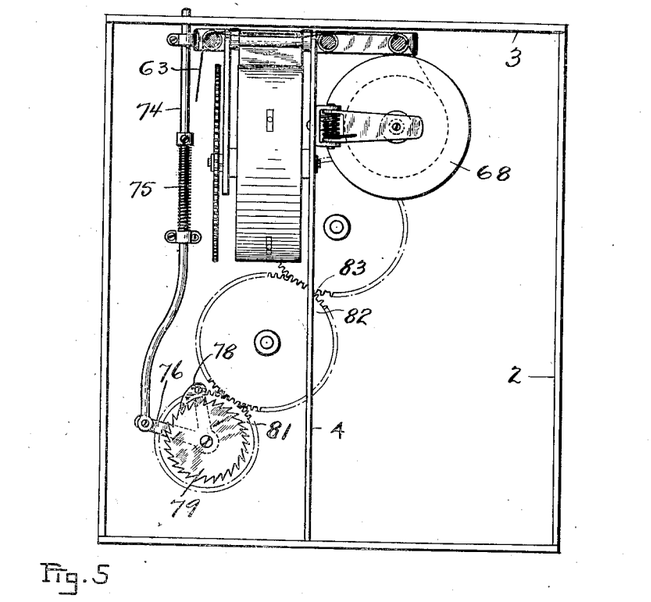
Fig. 5 is a detail elevation of one end of the meter showing the means for operating the printing ribbons.

In order that clear impressions may be produced at each identification entry, means are provided for advancing the printing ribbons a slight distance for each operation are provided for advancing the printing ribbons 63 and 64 are arranged respectively upon the reels 65—66 and 67—68, the ribbon passing from reel 65 to reel 66 and vice versa and from reel 67 to 68 and vice versa. are ararnged in proper position with relato the other, pass over the platen where they are arranged in proper position with relation to the tapes to produce the desired results. The reels 65 and 67 are mounted upon a hollow shaft 69 which is mounted upon the shaft 71 which is revoluble. The shaft 69 may be clamped to shaft 71 and caused to revolve therewith, by means of the nut 72, or it may revolve independently of the shaft 71. Reels 66 and 68 are similarly mounted on shaft 73 and when one set of reels is tight on its carrying shaft, the others should be loose. The shaft 71 is rotated by the movement of the printing member 51 through the medium of the rod 74 which projects through the cover of the case and is held in contact with one end of the member by means of the spring 75.

Pivotally attached to the lower end of the rod is a bell crank 76, supported at its fulcrum on the shaft 71, and having a pawl 78 on its other arm adapted to engage a ratchet 79 secured to shaft 71. The movement of the handle of the printing device thereby causes a step by step movement of shaft 71, which is transferred to shaft 73 by means of the gears 81—82—83 and 84. Provision is also made for preventing the advancement of the tapes by means external to the device. Since access must be had to the tape to allow the operative to enter the job number thereon, this feature might be taken advantage of to move the tape forward by placing an instrument in contact with it at the aperture. In order to overcome this liability of fraud, I provide a shutter which closes that part of the aperture in which the tape is exposed and which when opened, locks the tape against movement. The shutter consists of a slide 85 arranged on the cover of the case, having its front end which is adapted in the forward position of the slide to overlie the aperture, provided with a glass inset 86 so that the tape may be observed without moving the slide. Arranged on the under side of the cover, and connected to the slide by means of a pin extending through a slot in the cover, is a block or plate 87 having an inclined surface, which is engaged by a head 88, the arm 89 carrying which is pivotally attached to the plate 47 over which the tapes travel. The head is held against the block 87 by means of the tension spring 91 which is attached to the arm 92 secured to the arm 89 adjacent the pivotal point. The head is provided with downwardly projecting pins 93 which pass through the tapes and into holes in the plate 47. When the slide 85 is drawn back by the operative for any purpose, the block 87 is moved, causing the head to be depressed and the pins to engage the tapes and prevent their movement. The inclined surface on the block is generally made short so that the tapes will be impaled with the initial movement backward of the slide. The slide is returned to its forward position, when released, by the spring 94 operatively connected to the block 87. Any improper movement of the tapes from sources external to the device is therefore prevented.

Figure 9:
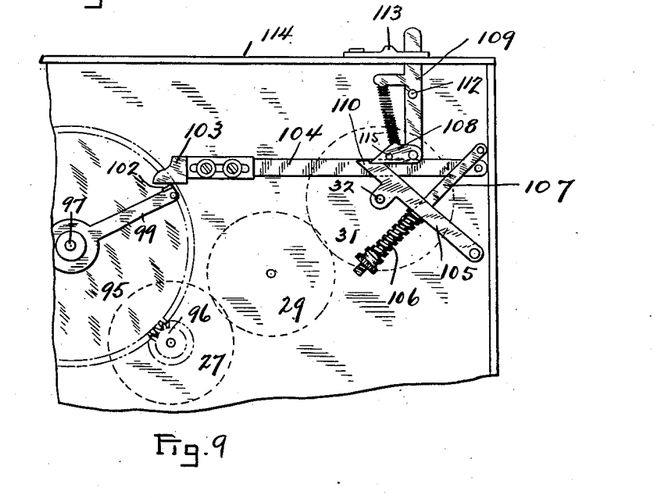
Fig. 9 is a detail showing the mechanism for automatically throwing the driving mechanism out of operation.

Means are also provided for automatically stopping the movement of the tapes at any desired time, such as at noon, or at six o'clock in the afternoon, so that no tape will be fed after the time at which the operative stops work or is supposed to stop work. Rotatably supported within the casing is a gear 95 having delineated upon its face a dial, divided according to time, in the present instance, the dial being divided into twelve hour periods with fifteen minute subdivisions. The gear 95 is rotated once in twelve hours, by the gear 96 attached to the driving shaft upon which gear 27 is mounted. It is evident that by varying the size of either gear 95 or 96 a different rate of rotation of the dial may be obtained. Arranged on the dial and being secured thereto by means of the thumb-nut 97 are a plurality of fingers 98—99 which extend radially of the dial. The position of these fingers on the dial may be readily changed to meet the requirements under which the device is operating, and may be placed to stop the movement of the tapes at any time. On the outer edge of each finger is a small lip 102, which in the revolution of the dial contacts with the shoe 103 adjustably attached to arm 104, the upward movement of which operates to disengage gear 31 from gear 29 and thereby stop the movement of the tapes.

The shaft 32, carrying gear 31 is mounted at that end adjacent said gear, in the arm 105 which is pivotally attached to the frame at a suitable point, so that gear 31 may be moved into or out of mesh with gear 29. A spring 106 mounted on the arm 107 presses upward on the arm 105 and tends to move the gear 31 out of mesh. When it is desirable to cause the tapes to be moved, however, the arm 105 is locked in position against the action of the spring. The upper edge of the arm 105 is provided with a shoulder 107 which is adapted to be engaged by the spring pressed shoe 108 pivotally attached to the lower end of the lever 109 which is fulcrumed intermediate its ends at 112, the upper end of the lever 109 extending above the cover of the case, so that it may be manipulated by the operative. A spring held keeper 113, mounted on the frame piece 114, engages the lever 109 in its retracted position, holding the shoe 108 in contact with the shoulder 107 and holding the gears 29 and 31 in mesh.

The shoe 108 lies adjacent the arm 104 and the shoe is provided with a pin 115 which overlies the arm. As the arm 104 is raised, under the action of the fingers 98 or 99, the arm contacting with the pin 115, raises the shoe 108 out of engagement with the shoulder 107 and allows the spring 106 to move the arm 105 to disengage the gears. During the time that the arm 104 is held in its elevated position by either of the fingers, the shoe 108 cannot be moved into engagement with the shoulder 107 and by adjusting the position of shoe 103 on arm 104 the time during which the gears may not be thrown into mesh may be varied. For instance, the finger 98 may be set to raise the arm 104 and disconnect the gears at twelve o'clock and the shoe 103 can be adjusted so that it is in contact with the finger until one o'clock when it is released. The operative can not start the movement of the tapes until one o'clock and the tapes do not start after that time until the operative moves the upper end of lever 109 forward to cause the shoe 108 to engage the shoulder 107 and moves it backward to move the gears into mesh.

In such operation, it may happen that the ends of the teeth on gears 29 and 31 will contact with each other and not drop into mesh. In order to overcome this difficulty I provide the plunger 117, which is pressed upward by the spring 118. The upper end of the plunger extends above the top of the case and its lower end lies adjacent the periphery of gear 31. On the lower end of the plunger is a tooth or teeth, in this instance, shown as a pinion 119 fixed to the plunger, which in the downward movement of the plunger engages the teeth of gear 31 and revolves the gear the distance of half a tooth, so that it will mesh with gear 29.

The rate at which the tapes are moved is made conformable to a fixed money scale and is controlled and varied according to the money value of the time which the machine is recording. A certain length of the tape is taken to represent a certain value in money, for instance, six inches of tape represents one dollar. The circumference of the tape carrier being fixed, it is evident that for different money values of time, a different rate of movement of the carrier must be obtained. That is, the length of the tape advanced in a given time must represent the money value of that time regardless of the money value of a unit of time. Six inches of tape represents one dollar regardless of whether the tape has moved the six inches in one hour or in four hours, so that the length of the tape always represents the money value of the elapsed time.

The rate of rotation of the carrier is varied by changing the relative diameters of gears 27 and 31. The gear 27 makes a complete revolution in a fixed time period, so that the rate of rotation of shaft 32 and must be varied by changing the diameter of gears 27 and 31 in order that the tape carrier will be moved at the required speed. These features of the apparatus are fully disclosed in my prior applications for letters patent hereinbefore stated and it is not believed that further explanation and description is necessary in this instance.

I claim:

1. In a system for producing comparable records of the time costs of different operations under different rates, the combination of a plurality of measuring machines each comprising a casing having an aperture therein; means for moving a tape under said aperture, the rate of movement in each case being proportioned to elapsing time and the characteristic rate of time cost for the operation being performed, a shutter arranged on the casing and adapted to open and close said aperture, and means operated by the movement of the shutter in opening said aperture to prevent the movement of the tape.

2. In a system for producing comparable records of the time costs of different operations under different rates, the combination of a plurality of measuring machines each comprising a casing having an aperture therein; means for moving a tape under said aperture, the rate of movement in each case being proportioned to elapsing time and the characteristic rate of time cost for the operation being performed, a shutter arranged on the casing and adapted to open and close said aperture, a pin in operative relation to the shutter, and means operated by the movement of the shutter in opening said aperture to move the pin into engagement with the tape.

3. In a system for producing comparable records of time cost of different operations under different rates, the combination of a plurality of tapes, means for each tape for simultaneously perforating a transverse line therein, means for automatically feeding said tapes each relative to its respective perforating means, the rate of feed in each case being proportional to elapsing time and the characteristic rate of time cost for the operation being performed, and means automatically to place identification marks upon the tape simultaneously with the perforation thereof.

4. In a system for producing comparable records of time cost of different operations under different rates, the combination of a plurality of measuring machines each comprising a machine having a length determining element, clockwork mechanism for automatically feeding a tape relative to its length determining element, the rate of feed in each case being proportional to elapsing time and the characteristic rate of time cost for the operation being performed, means for applying said length determining element to its tape, and means for simultaneously applying identification marks thereon.

5. In a system for producing comparable records of time costs of different operations under different rates, the combination of a plurality of measuring machines each comprising a casing having an aperture therein, means for moving a tape under said aperture the rate of movement in each case being porportioned to elapsing time and the characteristic rate of time cost for the operation being performed and means arranged on the casing above the aperture for simultaneously perforating a transverse line in the tape and printing identification marks thereon.

6. In a system for producing comparable records of time costs of different operations under different rates, the combination of a plurality of measuring machines each comprising a casing having an aperture therein, a tape carrier for moving a tape under said aperture the rate of movement in each case being proportioned to elapsing time and the characteristic rate of time cost for the operation being performed, means for actuating the carrier, means arranged on the casing above said aperture for simultaneously perforating a transverse line in the tape and printing identification marks thereon, and a handle for operating said means.

7. In a system for producing comparable records of time costs of different operations under different rates, the combination of a plurality of measuring machines each comprising a casing having an aperture therein, means for moving a tape under said aperture the rate of movement in each case being proportioned to elapsing time and the characteristic rate of time cost for the operation being performed, means for printing upon the tape arranged above said aperture and a key containing identification marks adapted to be inserted in said printing means.

8. In a system for producing comparable records of time costs of different operations under different rates, the combination of a plurality of measuring machines each comprising a casing having an aperture therein, means for moving a tape under said aperture the rate of movement in each case being proportioned to elapsing time and the characteristic rate of time cost for the operation being performed, a printing device arranged above said aperture, a printing ribbon arranged between the tape and the printing device and means operated by the movement of the printing device for advancing the printing ribbon a slight distance.

9. In a system for producing comparable records of the time costs of different operations under different rates, the combination of a plurality of machines each comprising a casing, tape moving mechanism in the casing, the rate of movement in each case being proportioned to elapsing time and the characteristic rate of time cost for the operation being performed, means for marking the tape to indicate the length moved for any given interval, a removable member carrying identification marks adapted to be inserted in the machine, and a handle on the machine for simultaneously marking the length of the tape and applying the said identification marks to the tape.

10. In a system for producing comparable records of the time costs of different operations under different rates, the combination of a plurality of machines each comprising a casing, tape moving mechanism in the casing, the rate of movement in each case being proportioned to elapsing time and the characteristic rate of time cost for the operation being performed, means for marking the tape to indicate the length moved for any given interval, a removable member carrying identification marks adapted to be inserted in the machine, and means for simultaneously marking the length of the tape and applying the said identification marks to the tape.

11. In a system for producing comparable records of the time costs of different operations under different rates, the combination of a plurality of machines each comprising a casing, tape moving mechanism in the casing, the rate of movement in each case being proportioned to elapsing time and the characteristic rate of time cost for the operation being performed, means for marking the tape to indicate the length moved for any given interval, and a removable member adapted to be inserted in the machine for placing identification marks upon a length of tape by said marking means.

12. In a system for producing comparable records of the time cost of different operations under different rates, the combination of a plurality of impression surfaces, a length determining element for each, means for automatically feeding said impression surfaces each relative to its respective length determining element, the rate of feed in each case being proportional to elapsing time and the characteristic rate of time cost for the operation being performed, means for applying the length determining element to the impression surface and means also for applying an identification marking to the surface, the length of which has been determined.

13. In a recording machine means whereby a record surface may be moved proportionately both as to elapsed time and time cost rate, means for changing the rate of movement to correspond to changes in the time cost rate, means for indicating on said surface the beginning of a time period and mechanism for simultaneously placing on said surface a symbol identifying the time period.

14. In a system for producing comparable records of the time cost of different operations under different rates the combination of a plurality of instruments having each a length determining element, means for automatically feeding an impression surface in each machine, each relative to its respective length determining element, the rate of feed in each case being proportional both to the elapsing time and characteristic rate of time cost for the operation being performed, means for applying the length determining element to the impression surface and mechanical means carried by said machine for also applying a symbol to said surface identifying the time period.

15. Means for recording the time cost of different operations under different rates comprising the combination of a plurality of measuring devices having each a record carrier for holding a record surface, means for feeding said surface relatively to a certain point in the machine, the rate of feed in each case being proportional both to elapsed time and to the value of elapsed time for the operation performed, a common linear scale of money value whereby the length of record surface fed with relation to the fixed point for each operation represents on the linear scale the money value of the elapsed time, and a removable identification member adapted when placed in the machine to cause an identifying mark to be placed upon the length of record surface fed for the operation performed.

16. Means for recording the time cost of different operations under different rates comprising the combination of a plurality of measuring devices having each a record carrier for holding a record surface, means for feeding said surface relatively to a certain point in the machine, the rate of feed in each case being proportional both to elapsed time and to the value of elapsed time for the operation performed, a common linear scale of money value whereby the length of record surface fed with relation to the fixed point for each operation represents on the linear scale the money value of the elapsed time, a removable identification member, and marking mechanism for each measuring device to mark the record at the beginning of a time period and to coöperate with the identification member, thereby simultaneously to place an identification mark upon the record.

In testimony whereof, I have hereunto set my hand at San Francisco, California, this 29th day of May, 1912.

JOHN T. QUIGLEY.

In presence of—
H. G. Prost,
P. S. Pidwell.